(12) United States Patent
Hung

(10) Patent No.: US 7,118,492 B2
(45) Date of Patent: Oct. 10, 2006

(54) STRUCTURE OF A HANDLE SLEEVE OF A GOLF CLUB

(75) Inventor: Chi-Chih Hung, Feng-Shan (TW)

(73) Assignee: Eing Nan Rubber Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 11/052,873

(22) Filed: Feb. 9, 2005

(65) Prior Publication Data

US 2006/0178226 A1 Aug. 10, 2006

(51) Int. Cl.
*A63B 53/14* (2006.01)

(52) U.S. Cl. .................................. 473/300; 473/301

(58) Field of Classification Search ........ 473/300–303,
473/549–552, 523, 568; 74/551.9; 81/489,
81/492; 16/DIG. 12, 18–19, 24, 421, 430;
280/821

See application file for complete search history.

(56) References Cited

U.S. PATENT DOCUMENTS

| 6,974,626 B1* | 12/2005 | Horacek ...................... 428/354 |
| 2005/0170905 A1* | 8/2005 | Chen .......................... 473/300 |

* cited by examiner

*Primary Examiner*—Stephen Blau
(74) *Attorney, Agent, or Firm*—Rosenberg, Klein & Lee

(57) ABSTRACT

A golf club has a handle sleeve around the shaft, which sleeve includes an elastic rubber sleeve part, and an outer covering part; the rubber sleeve part has such an inner diameter as to be tightly secured around the shaft; the rubber sleeve part has a recess portion on an outer side; the covering part includes an inner layer made of the same material as the rubber part, and an outer grip layer; the outer grip layer and the inner layer are sewn together; the outer covering part and the rubber sleeve part are securely stuck together by means of adhesive, which is applied over the inner layer of the outer covering part and the rubber sleeve part, and which has already dissolved the inner layer of the outer covering part and the rubber sleeve part slightly before the outer covering part is positioned onto the rubber sleeve part.

3 Claims, 6 Drawing Sheets

STRUCTURE OF A HANDLE SLEEVE OF A GOLF CLUB

BACKGROUND OF THE INVENTION

1. Field of the Invention

The present invention relates to a handle sleeve of a golf club, more particularly one, which includes an inner rubber sleeve part, and an outer covering part having an inner layer made of the same material as the inner rubber sleeve part and securely joined to the inner rubber sleeve part by means of adhesive, which has already slightly dissolved both the outer covering part and the inner rubber sleeve part before the former is positioned onto the latter.

2. Brief Description of the Prior Art

Referring to FIGS. 5 and 6, a conventional handle sleeve 6 of a golf club is available, which includes a rubber sleeve part 61, and an outer covering part 62 around the rubber sleeve part 61, and which is securely positioned around an upper end portion of a shaft 5 of the golf club. The rubber sleeve part 61 has excellent elasticity, and it has such an inner diameter as to be tightly secured around the upper end portion of the shaft 5. In addition, the rubber sleeve part 61 has a recess portion 611 on an outer side. The outer covering part 62 can be made of genuine leather or synthetic leather. To join the outer covering part 62 and the rubber sleeve part 61 together, first adhesive is applied over an inner side of the outer covering part 62. Then, the outer covering part 62 is wound around the recess portion 611 of the rubber sleeve part 61 in such a way as to cover the recess portion 611; thus, the outer covering part 62 and the rubber sleeve part 61 are stuck together.

The above handle sleeve has disadvantages as followings:

1. The outer leather covering part and the rubber sleeve part can't be securely joined together by the adhesive because the outer covering part and the rubber sleeve part are made of different materials, and the adhesive doesn't have the same strong adhesive force on both the outer covering part and the rubber sleeve part. Therefore, it is possible for the outer covering part to move relative to the rubber sleeve part when the handle sleeve is subjected to violent vibration resulting from the golf club hitting a ball. And, the outer covering part will separate from the rubber sleeve part eventually.

2. The outer leather covering part and the rubber sleeve part can't be securely joined together by the adhesive because the outer leather covering part and the rubber sleeve part are made of different materials, and the adhesive doesn't have the same strong adhesive force on both the outer covering part and the rubber sleeve part. Therefore, the outer covering part will separate from the rubber sleeve part after the handle sleeve has been exposed to the sun, wind, and rain for a long time.

3. The outer leather covering part and the rubber sleeve part can't be securely joined together by the adhesive because the outer leather covering part and the rubber sleeve part are made of different materials, and the adhesive doesn't have the same strong adhesive force on both the outer covering part and the rubber sleeve part. Therefore, the outer covering part is prone to separate from the rubber sleeve part when the handle sleeve is made to enlarge for easy assembling by means of an air pump.

SUMMARY OF THE INVENTION

It is a main object of the invention to provide an improvement on a handle sleeve of a golf club to overcome the above disadvantages.

The handle sleeve is positioned around a shaft of the golf club, and includes an elastic rubber sleeve part, and an outer covering part. The rubber sleeve part has a recess portion on an outer side, and it such an inner diameter as to be tightly secured around the shaft. The outer covering part includes an inner layer made of the same material as the rubber part, and an outer grip layer; the outer grip layer and the inner layer are sewn together. The outer covering part and the rubber sleeve part are securely stuck together by means of adhesive, which is applied over the inner layer and the rubber sleeve part. The adhesive has already dissolved the inner layer of the outer covering part and the rubber sleeve part slightly before the outer covering part is positioned onto the rubber sleeve part. Therefore, the adhesive makes the outer covering part and the rubber sleeve part securely stuck together.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
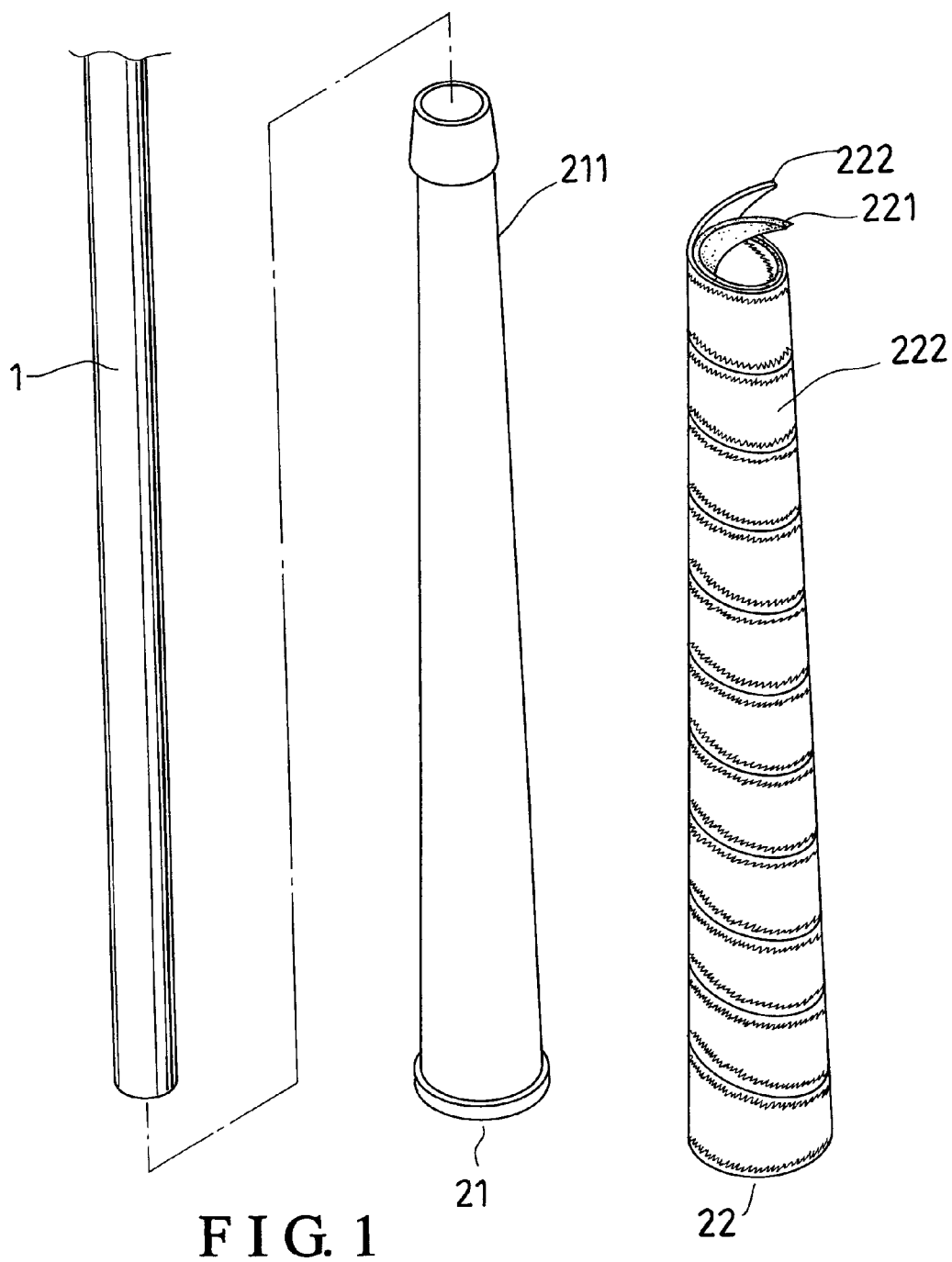
FIG. 1 is an exploded perspective view of the first embodiment of a handle sleeve of a golf club according to the present invention.
Figure 2:
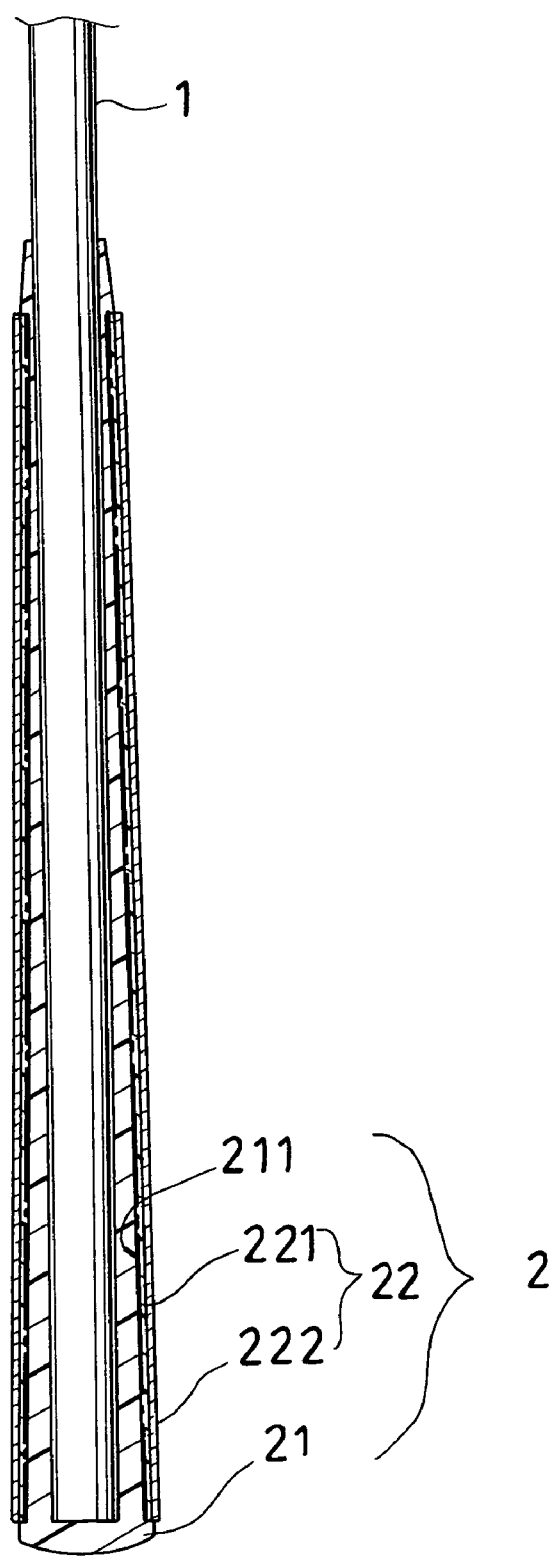
FIG. 2 is a partial vertical sectional view of a golf club with the first type of handle sleeve in the present invention.
Figure 3:
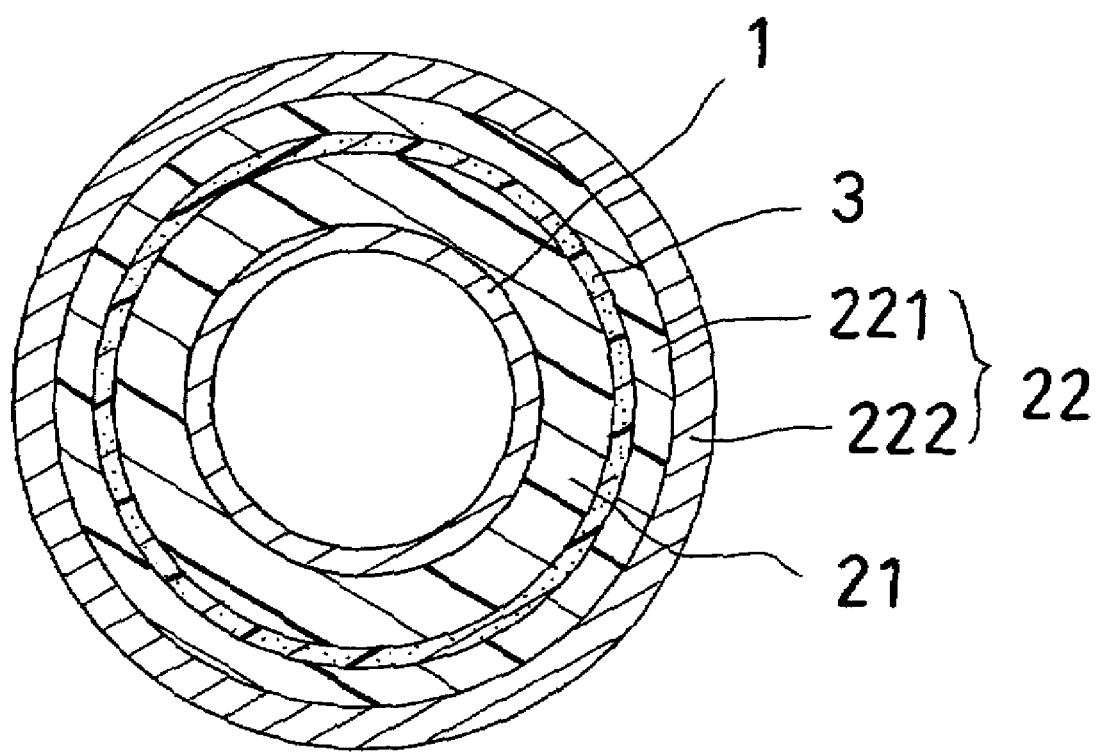
FIG. 3 is a horizontal sectional view of a golf club with the first type of handle sleeve.

Referring to FIGS. 1 to 3, a preferred embodiment 2 of a handle sleeve of a golf club includes a rubber sleeve part 21, and an outer covering part 22.

The rubber sleeve part 21 is disposed around an upper end portion of a shaft 1 of a golf club. The rubber sleeve part 21 has excellent elasticity, and it has such an inner diameter as to be tightly secured around the upper end portion of the shaft 1. In addition, the rubber sleeve part 21 has a recess portion 211 on an outer side.

The outer covering part 22 includes an inner layer 221, and an outer grip layer 222. The inner layer 221 of the outer covering part 22 is made of the same material as the rubber sleeve part 21. And, the inner layer 221 and the outer grip layer 222 are closely pressed and sewn together. The outer covering part 22 is wound around the recess portion 211 of the rubber sleeve part 21 in such a way as to cover the recess portion 211 of the rubber sleeve part 21, and the outer covering part 22 and the rubber sleeve part 21 are stuck together by means of adhesive, which has already been applied over the inner layer 221 of the outer covering part 22 and the rubber sleeve part 21, and which has already slightly dissolved the inner layer 221 of the outer covering part 22 and the rubber sleeve part 21 before the outer covering part 22 is positioned on the rubber sleeve part 21. Consequently, the outer covering part 22 and the rubber sleeve part 21 of the handle sleeve 2 are securely stuck together, and can't be separated.

Figure 4:
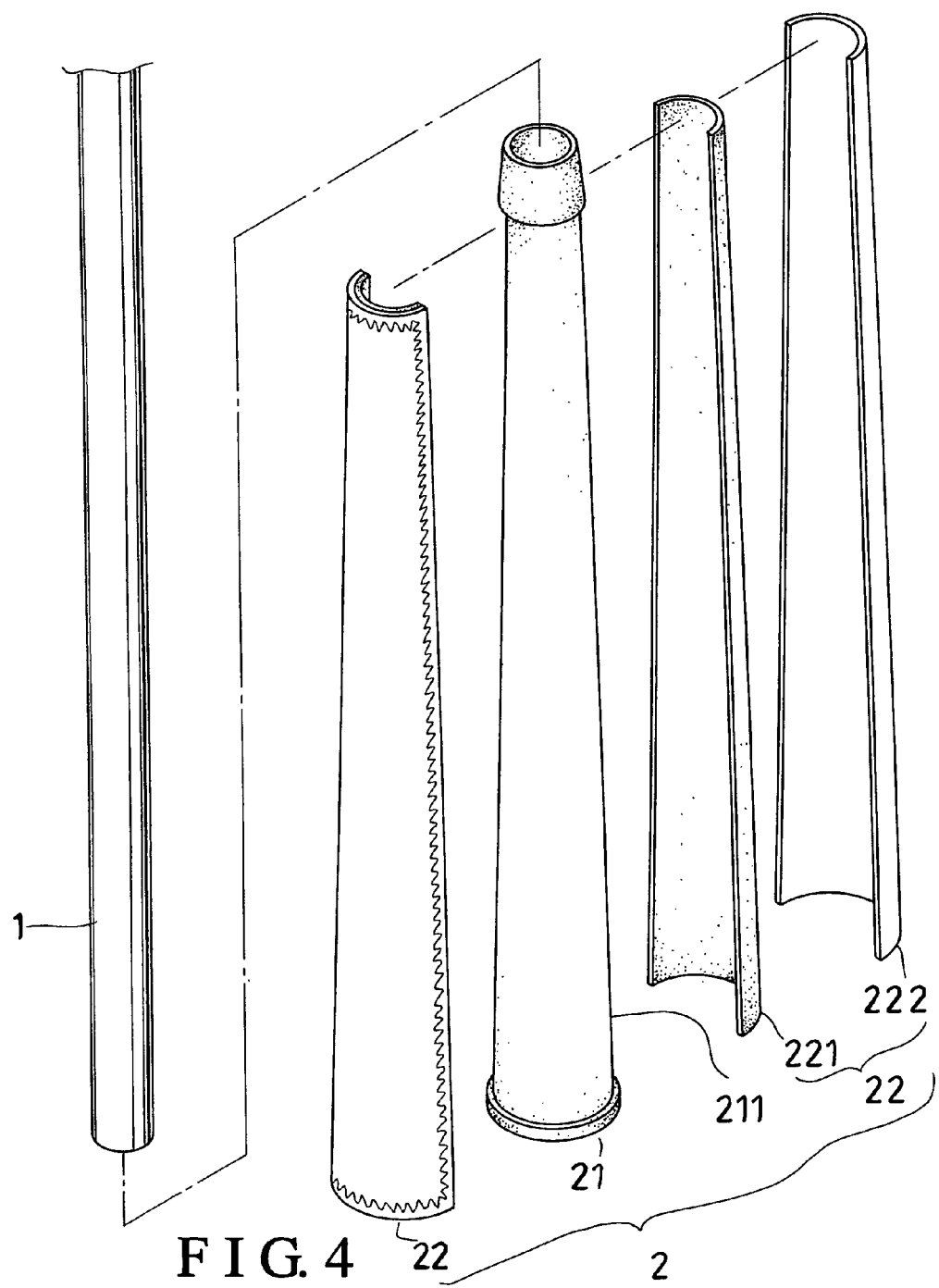
FIG. 4 is an exploded perspective view of the second embodiment of a handle sleeve of a golf club.
Figure 5:
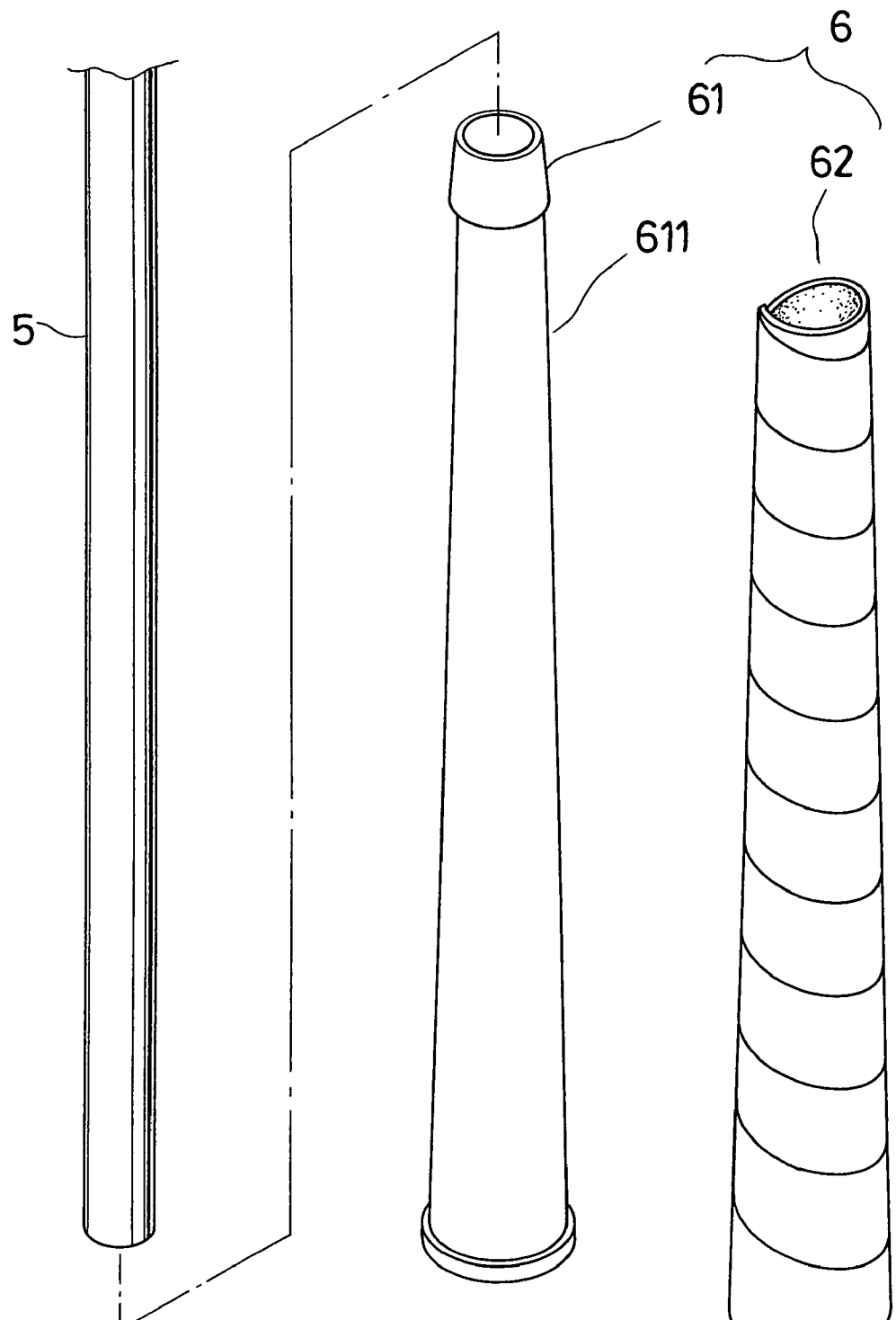
FIG. 5 is an exploded perspective view of the conventional handle sleeve of a golf club as described in Background.
Figure 6:
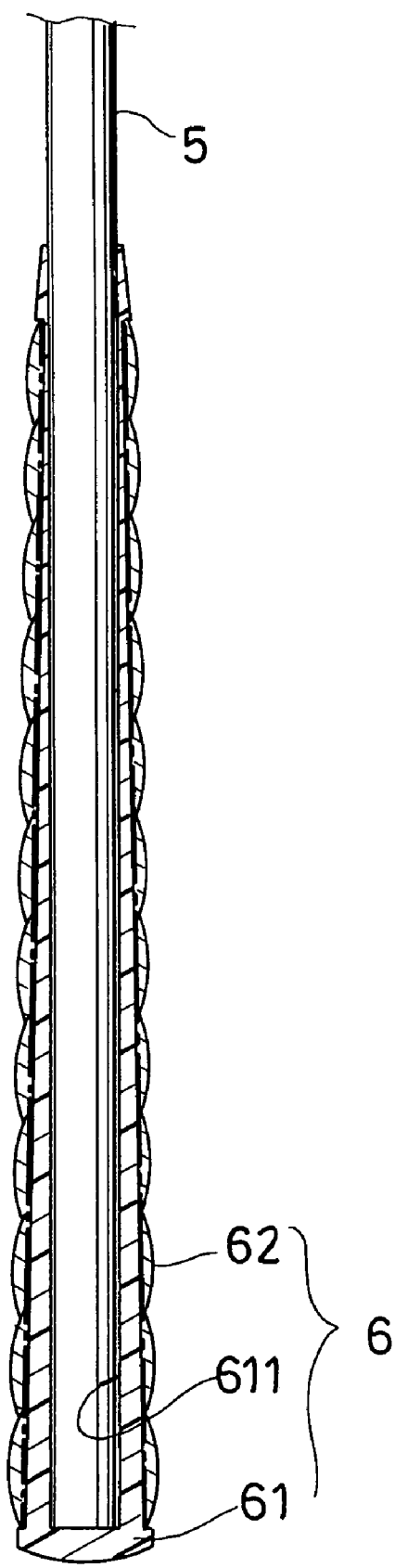
FIG. 6 is a partial vertical sectional view of a golf club with the conventional handle sleeve.

Referring to FIG. 4, which shows another embodiment of the invention, instead of being wound around the recess portion 211 of the rubber sleeve part 21, the outer covering part 22 is disposed over the recess portion 211 to cover the recess portion 211 completely. The outer covering part 22 can be made to have a single part, which is made by means of sewing an inner layer 221 and an outer grip layer 222 together. Or alternatively, the outer covering part 22 can be made to have several separate parts, each of which is made by means of sewing a pair of inner layer 221 and outer grip layer 222 of the same size together, and which together will cover the recess portion 211 of the rubber sleeve part 21 completely. And, the outer covering part 22 and the recess portion 211 of the rubber sleeve part 21 are securely stuck together in the same way as those of the first embodiment.

From the above description, it can be understood that the present invention has advantages as followings:

1. The outer covering part and the rubber sleeve part of the handle sleeve are securely stuck together, and they can't possibly separate, even when the handle sleeve is subjected to violent vibration resulting from the golf club hitting a ball, because the inner layer of the outer covering part and the rubber sleeve part are made of the same material, and because the adhesive, which is used to stick the inner layer of the outer covering part and the rubber sleeve part together, has already dissolved the inner layer and the rubber sleeve part slightly before the outer covering part is positioned on the rubber sleeve part.

2. It is not possible for the outer covering part and the rubber sleeve part of the handle sleeve to separate, even after the handle sleeve has been exposed to the sun, wind, and rain for a long time, because the inner layer of the outer covering part and the rubber sleeve part are securely stuck together.

3. It is not possible for the inner layer and the outer grip layer of the outer covering part to separate, even when the handle sleeve is subjected to violent vibration of teeing off or after the handle sleeve has been exposed to the sun, wind, and rain for a long time, because the inner layer and the outer grip layer are closely pressed and sewn together.

4. The outer covering part and the rubber sleeve part can't separate, and the inner layer and the outer grip layer of the outer covering part can't separate either, even when the handle sleeve is made to enlarge for easy assembling by means of an air pump, because the inner layer of the outer covering part and the rubber sleeve part are securely stuck together, and because the inner layer and the outer grip layer are closely pressed and sewn together.

What is claimed is:

1. A handle sleeve of a golf club, comprising a rubber sleeve part; the rubber sleeve part being disposed around an upper end portion of a shaft of a golf club; the rubber sleeve part having elasticity; the rubber sleeve part having elasticity such an inner diameter as to be tightly secured around the upper end portion of the shaft; the rubber sleeve part having a recess portion on an outer side; and an outer covering part including:

(a) an inner layer made of a same material as the rubber sleeve part; and (b) an outer grip layer; the inner layer and the outer grip layer being closely pressed and sewn together;

the outer covering part being positioned around the recess portion of the rubber sleeve part; the outer covering part and the rubber sleeve part being stuck together by means of adhesive, which is applied over the inner layer of the outer covering part as well as the rubber sleeve part; the adhesive having already dissolved the inner layer of the outer covering part and the rubber sleeve part slightly before the outer covering part is positioned over the rubber sleeve part.

2. The handle sleeve of a golf club as claimed in claim 1, wherein the outer covering part is wound around the recess portion of the rubber sleeve part.

3. The handle sleeve of a golf club as claimed in claim 1, wherein the outer covering part is positioned over the recess portion of the rubber sleeve part to cover the recess portion completely.

* * * * *